(12) United States Patent
Berray et al.

(10) Patent No.: US 6,384,497 B1
(45) Date of Patent: May 7, 2002

(54) THERMALLY RESPONSIVE PROTECTION APPARATUS FOR ELECTRIC MOTORS

(75) Inventors: Gary C. Berray, Port Crane, NY (US); Mark E. Baer, Trout Run, PA (US)

(73) Assignee: Shop Vac Corporation, Williamsport, PA (US)

( * ) Notice: Subject to any disclaimer, the term of this patent is extended or adjusted under 35 U.S.C. 154(b) by 0 days.

(21) Appl. No.: 09/638,608

(22) Filed: Aug. 15, 2000

(51) Int. Cl.[7] ............................................. H02K 11/00
(52) U.S. Cl. ....................................... 310/68 C; 310/71
(58) Field of Search ................................. 310/68 C, 71; 337/24, 25, 279, 215, 227, 197, 198, 401

(56) References Cited

U.S. PATENT DOCUMENTS

| | | |
|---|---|---|
| 1,001,152 A | 8/1911 | Lawrence |
| 2,759,065 A | 8/1956 | Moeller ........................ 200/131 |
| 2,767,285 A | 10/1956 | Kosak, Jr. .................... 200/142 |
| 3,913,051 A | 10/1975 | Manker et al. ............. 337/279 |
| 4,034,265 A | 7/1977 | DuRocher et al. ............ 361/25 |
| 4,132,913 A | 1/1979 | Lautner et al. ................ 310/68 |
| 4,164,726 A | 8/1979 | Weibe ........................ 337/215 |
| 4,267,542 A | 5/1981 | Weiner ........................ 337/227 |
| 4,360,725 A | 11/1982 | Eeckhout ..................... 219/253 |
| 4,486,736 A | 12/1984 | Olson et al. ................. 337/409 |
| 4,499,517 A | 2/1985 | Lisauskas ..................... 361/24 |
| 4,658,321 A | 4/1987 | Lindner ........................ 361/25 |
| 4,789,800 A | 12/1988 | Zimmermann ............... 310/68 |
| 5,600,193 A | 2/1997 | Matsushima et al. ......... 310/68 |
| 5,818,320 A | 10/1998 | Matsuoka .................... 337/198 |
| 5,886,612 A | 3/1999 | Beckert et al. ............. 337/197 |
| 5,982,270 A | 11/1999 | Wolfe, Jr. et al. ........... 337/401 |

FOREIGN PATENT DOCUMENTS

| | | | |
|---|---|---|---|
| EP | 0 511 776 A2 | 11/1992 | |
| FR | 2 673 323 A1 | 8/1992 | .................. 85/143 |

*Primary Examiner*—Nestor Ramirez
*Assistant Examiner*—Thanh Lam
(74) *Attorney, Agent, or Firm*—Marshall, Gerstein & Borun

(57) ABSTRACT

A thermal protection mechanism for electric motors includes a pair of spaced contacts secured to an electrically insulating carrier having a cavity and a surface adjacent to a motor winding. The surface of the carrier has an aperture that forms a thermal passage between the surface of the carrier and the cavity. The contacts are engaged with a fusible electrically conductive pin made of solder that is disposed within the cavity and that interposes along a current path to the windings of a motor. A high winding temperature causes the pin to fuse, thereby terminating operation of the motor.

20 Claims, 3 Drawing Sheets

THERMALLY RESPONSIVE PROTECTION APPARATUS FOR ELECTRIC MOTORS

TECHNICAL FIELD

The present invention relates generally to electric motors, and more particularly, to a thermally responsive protection apparatus for such a motor.

BACKGROUND ART

Electric motors often include mechanisms that terminate operation of the motor in response to thermal overload conditions that could result in permanent damage to the motor or associated equipment. A thermal overload, such as an excessively high winding or rotor temperature, may occur as a result of a locked rotor, a high mechanical load, a supply overvoltage, a high ambient temperature, or some combination of these conditions.

Thermal cut-outs (TCOs) are one well-known mechanism that may be used to protect an electric motor. Conventional TCOs are based on a thermally responsive element that fuses in response to a thermal overload condition, thereby interrupting the flow of electrical power to the protected apparatus. One typical approach uses a spring-loaded contact pin or lead that is held in electrical connection with an opposing contact by a fusible material such as solder. Another typical approach uses one or more springs, which are independent from a pair of electrical contacts and which urge the electrical contacts apart when a stop material melts in response to an elevated temperature. Both of these approaches are undesirable because the TCO typically includes a complex arrangement of springs and contact elements that are mounted in a housing. Thus, these approaches are inherently costly and do not allow for the direct inspection of the TCO because the fusible material and contact conditions are not usually visible through the housing.

Conventional current fuses may also be used to protect an electric motor from thermal overload conditions. Current fuses, such as cartridge style fuses, may be serially interposed in the current path of the motor windings. Typically, the current fuse is selected so that it interrupts the power supplied to the motor windings at a predetermined current level, such as a current level that could result in a dangerously high winding temperature. Current fuses are undesirable as a thermal overload protection mechanism because they are substantially operationally unresponsive to the actual temperature conditions within a motor, which could result in operation of the motor at a dangerously high winding temperature. Alternatively, a current fuse may prematurely terminate the operation of a motor in response to transient winding currents that would be insufficient to heat the thermal mass of the motor to cause a dangerously high winding temperature.

SUMMARY OF THE INVENTION

In accordance with one aspect of the present invention, a thermally responsive protection apparatus for an electric motor includes an electrically insulating carrier having a surface adjacent to a winding of the motor. The surface of the carrier provides a thermal passage between the surface of the carrier and a cavity within the carrier. The protection apparatus may further include first and second electrical contacts spaced apart and secured to the carrier and a fusible electrically conductive pin disposed within the cavity and having first and second end portions. The first and second end portions are engaged with the contacts and at least one of the contacts forces the pin against a wall defining at least a portion of the cavity.

The invention itself, together with further objects and attendant advantages, will be best understood by reference to the following detailed description, taken in conjunction with the accompanying drawings.

DESCRIPTION OF THE PREFERRED EMBODIMENTS

Figure 1:
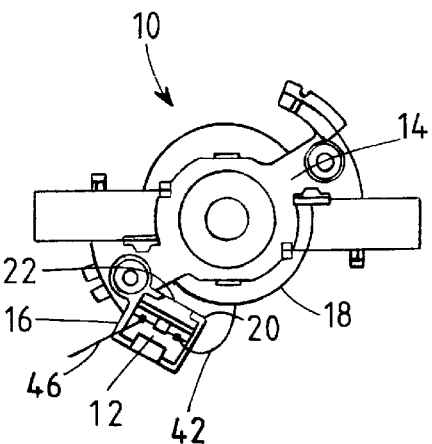
FIG. 1 is a plan view of an electric motor assembly incorporating a thermally responsive protection apparatus according to one embodiment of the present invention.

Illustrated in FIG. 1 is a plan view of an electric motor assembly 10 incorporating a thermally responsive protection apparatus 12 according to one embodiment of the present invention. The motor assembly 10 includes an electric motor 14 and an electrically insulating mount 16 that secures the thermally responsive protection apparatus 12 to the motor assembly 10 adjacent to a winding 18 of the motor 14. As illustrated in FIG. 1, a surface 20 of the mount 16 has an opening 22 that facilitates the conduction of heat from the winding 18 to the protection apparatus 12 as described in greater detail below.

Figure 2:
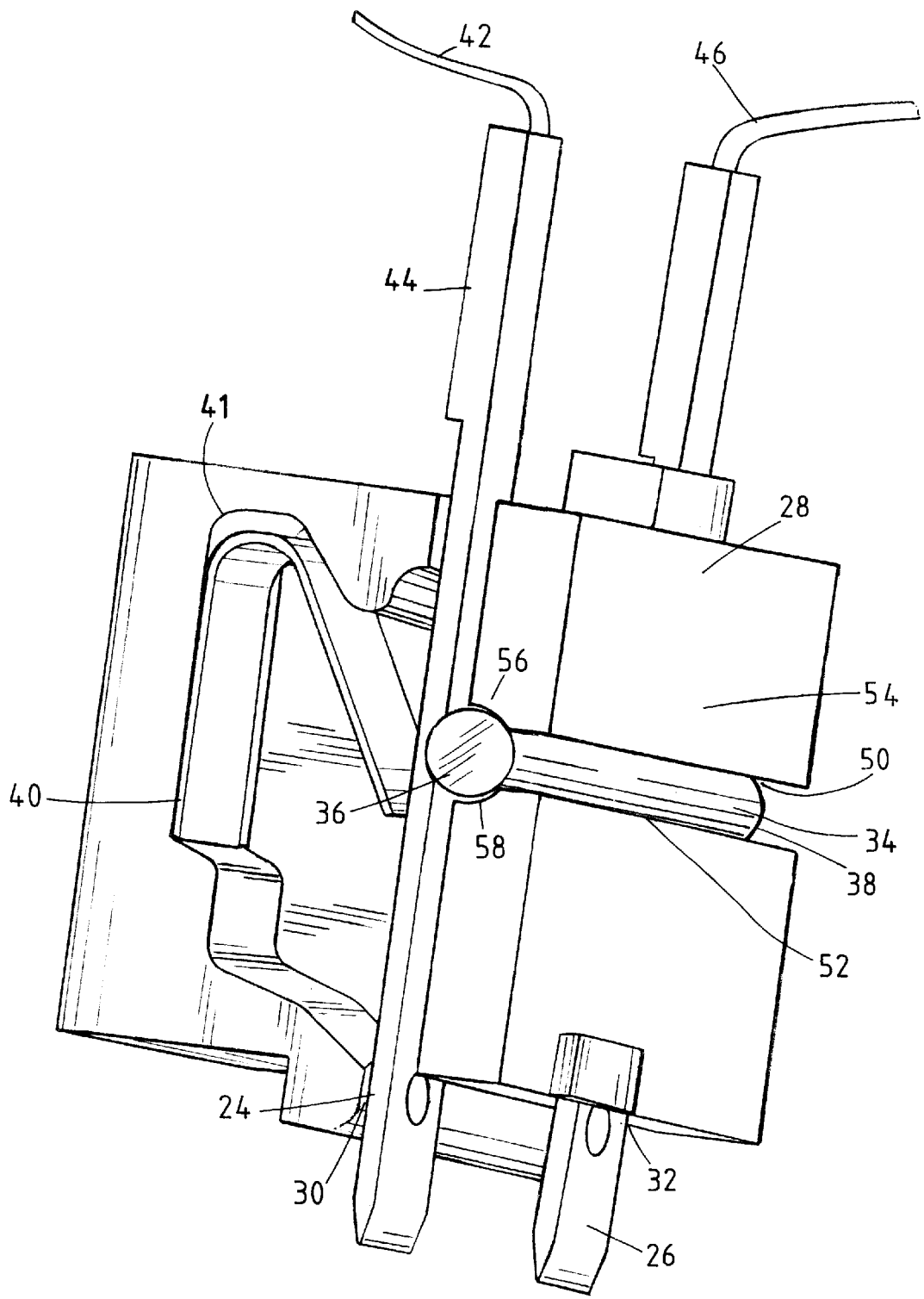
FIG. 2 is an isometric view illustrating in greater detail the thermally responsive protection apparatus of FIG. 1.

FIG. 2 illustrates in greater detail the thermally responsive protection apparatus 12 according to the present invention. The protection apparatus 12 is shown removed from the mount 16 for clarity. The protection apparatus 12 includes a first electrical contact 24 and a second electrical contact 26 spaced from the first electrical contact 24. The contacts 24 and 26 are secured to an electrically insulating carrier 28 within respective slots 30 and 32. The first and second contacts 24 and 26 are preferably made of brass or any other suitable electrical contact material and may be fabricated using stamping operations in a progressive die to minimize costs. For example, a commercially available contact such as product no. 62447-2manufactured by AMP, Inc. may be used for the contacts 24 and 26. However, those skilled in the art will recognize that a variety of known contact types may be substituted for the contacts 24 and 26 without departing from the scope of the invention.

The protection apparatus 12 further includes a fusible electrically conductive pin 34 that has a first end 36 engaged with the first contact 24 and a second end 38 engaged with the second contact 26, thereby providing an electrical path between the first and second contacts 24 and 26. Additionally, the protection apparatus 12 includes a first spring 40 and a second spring (not shown) that urge the respective first and second contacts 24 and 26 into electrical contact with the pin 34 and which, as discussed in greater detail below, may also secure the contacts 24 and 26 to the carrier 28. The first spring 40 and the second spring are preferably flat springs that are each bent to form a U-shape and which may be, for example, made of a metal such as stainless steel. Alternatively, other spring types (e.g., coil springs) and materials may be used without departing from the scope of the invention. The carrier 28 further includes a recess 41 that holds the first spring 40 and a similar recess (not shown) that holds the second spring (also, not shown).

A magnet wire 42 is connected between the winding 18 and a connector portion 44 of the first contact 24, and a lead wire 46 from a power source (not shown) is secured to a connector portion 48 of the second contact 26. Thus, the protection apparatus 12 is serially interposed in the path of power supplied to the winding 18 of the motor 14. Additionally, the protection apparatus 12 is located within the motor assembly 10 to be substantially responsive to the temperature of the winding 18. For example, the protection apparatus 12 may be located adjacent the winding 18 of the motor 14 as shown in FIG. 1.

As shown in FIG. 2, the carrier 28 includes a cavity 50 within which the pin 34 is disposed and further includes an aperture 52 which forms a thermal passage between a surface 54 of the carrier 28 and the cavity 50, thereby facilitating the conduction of heat from the motor winding 18 to the pin 34. Preferably, the cavity 50 includes cavity walls 56 and 58. The first spring 40 and the second spring (not shown) urge the first and second contacts 24 and 26 against the pin 24, thereby forcing the pin 34 into contact with the cavity walls 56 and 58.

By way of example only, the pin 34 is cylindrically shaped and the cavity walls 56 and 58 are substantially complementary to the shape of the pin 34. However, the shape of the cavity walls 56 and 58 need not be complementary to that of the pin 34. In fact, in some applications it may be desirable to shape the cavity walls 56 and 58 so that each of the cavity walls 56 and 58 contacts the pin 34 along a line or a point. By minimizing the contact area between the pin 34 and the cavity walls 56 and 58, the thermal resistance between the pin 34 and the carrier 28 may be maximized so that the pin 34 remains substantially thermally responsive to the ambient temperature within the aperture 52, which enables the pin 34 to remain substantially thermally responsive to the temperature of the winding 18. Preferably, the cavity 50 is larger than the pin 34 so that when the pin 34 fuses (i.e., melts) as described in greater detail below, the cavity walls 56 and 58 will not impede or prevent the formation of an open circuit along the length of the pin 34.

Additionally, while the aperture 52 is shown as a slot that fully traverses the width of the surface 54, those skilled in the art will recognize that other aperture geometries and sizes may be used without departing from the scope of the invention. For example, a rectangular aperture, a circular aperture, or an irregularly shaped aperture, any of which may or may not fully traverse the surface 54, may instead be used. Alternatively, in some embodiments the aperture 52 may be eliminated completely and heat from the winding 18 may be conducted directly through the surface 54 and the carrier 28 to the pin 34.

Preferably, the electrically insulating carrier 28 is made of a thermoplastic material or any other suitable electrically insulating material. The carrier 28 may be injection molded, for example, so that some or all of structural features needed to assemble and secure the pin 34, the contacts 24 and 26, and the springs may be integrally molded into the carrier 28 to minimize the number of components needed to fabricate the protection apparatus 12.

The material used for the pin 34 substantially determines the winding temperature at which the protection apparatus 12 will fuse and terminate operation of the motor 14. The pin 34 is preferably made of an electrically conductive thermally deformable material that fuses at a temperature that is at or below the maximum safe operating temperature for the winding 18 of the motor 14. For example, a solder having a melting point of 255° F. provides adequate overload protection for a typical electric motor. A variety of solder compositions, other materials, or combinations of materials providing different melting points may be substituted to make the pin 34 without departing from the scope of the invention.

The material and geometry of the pin 34 substantially determines the resistance which is serially interposed within the path of power to the motor 14 by the protection apparatus 12, which in turn determines the maximum amount of continuous current that the protection apparatus 12 can conduct to the winding 18 of the motor 14 at a given ambient temperature. As is known in the art, the resistance of the pin 34 is directly proportional to the resistivity of the material used for the pin 34 and to the length of the pin 34, and the resistance of the pin 34 is inversely proportional to the cross sectional area of the pin 34. Winding current passing through the resistance of the pin 34 internally heats the pin 34 and produces a self-heating offset that causes the temperature of the pin 34 to exceed the local ambient temperature. Thus, the pin 34 will fuse and terminate the operation of the motor 14 when the self-heating offset due to the winding current plus the local ambient temperature reaches the fusing temperature of the pin 34.

In accordance with the present invention, the geometry of the pin 34 is selected so that the self-heating offset is relatively small at maximum winding current (e.g., under locked rotor conditions). As a result, the fusing of the protection apparatus 12 is substantially determined by the local ambient temperature, which is substantially determined by the actual temperature of the motor winding 18. Thus, the protection apparatus 12 will not improperly terminate operation of the motor 14 in response to transient currents or under load conditions that do not cause dangerously high winding temperatures. For example, due to the thermal mass of the motor 14, the protection apparatus 12 may allow the motor 14 to operate at very high loads for short durations. Alternatively, the protection apparatus 12 may allow the motor 14 to operate at higher continuous duty loads when ambient temperature conditions permit.

Preferably, the pin 34 has a cylindrical or rectangular cross-sectional shape and may be cut from continuous stock material to minimize costs. It may be desirable for some applications to employ more complex pin geometries that define more reliably and/or precisely where the pin 34 will fuse along its length. For example, the profile of the pin 34 may be tapered so that its smallest cross sectional area lies between the first and second contacts 24 and 26.

Figure 3:
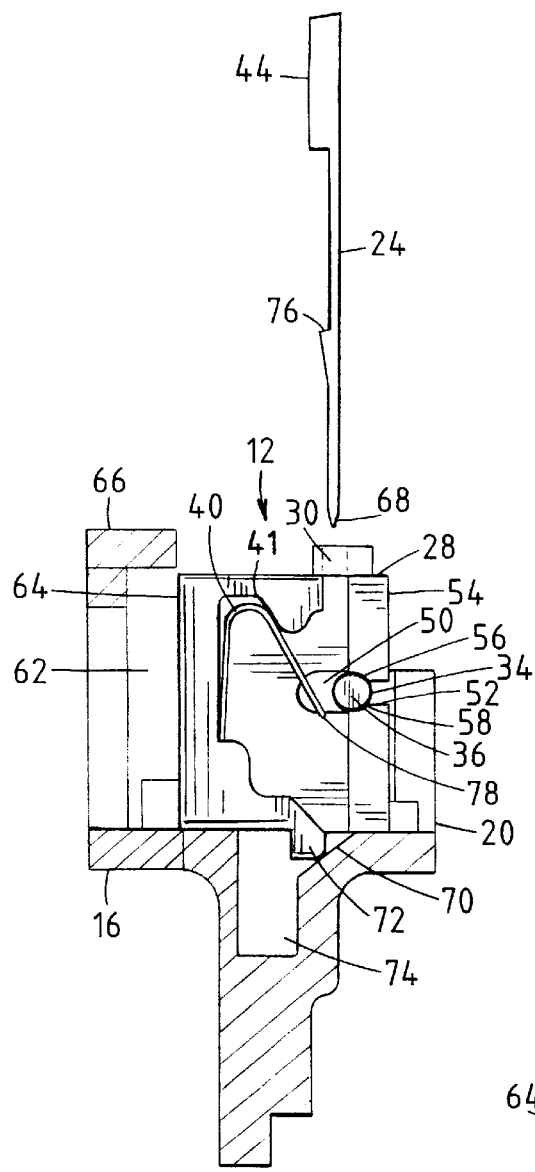
FIGS. 3 and 4 are side elevational views, partially in section, illustrating a manner in which the protection apparatus shown in FIGS. 1 and 2 may be secured to the mount of FIG. 1.
Figure 4:
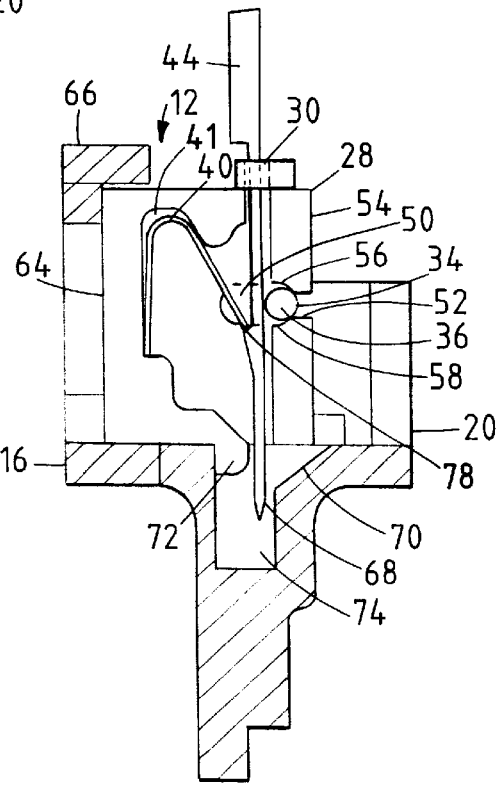

FIGS. 3 and 4 are side elevational views, partially in section, illustrating a manner in which the protection apparatus 12 may be secured to the mount 16. Initially, as shown in FIG. 3, the pin 34 is disposed within the cavity 50, the first spring 40 is mounted within the recess 41, the second spring is mounted within its respective recess, and the carrier 28 (including the springs and the pin 34) is placed into a receptacle area 62 within the mount 16 so that the surface 54 of the carrier 28 is in close proximity to the surface 20 of the mount 16 and so that a back edge 64 of the carrier 28 is spaced from (and thus does not lie under) a retaining lip 66 of the mount 16.

As shown in FIG. 4, when the first contact 24 is inserted into the respective slot 30, a tip 68 of the first contact 24 engages and slides along a sloped surface 70 of the mount 16 to drive the back edge 64 of the carrier 28 under the retaining lip 66. The contact 24 is eventually pushed down sufficiently far to cause the tip 68 to extend below a stop 72. The interference of the tip 68 with the stop 72 prevents the protection apparatus 12 from being pulled vertically out of the mount 16. When the first contact 24 is fully inserted within the carrier 28, the tip 68 extends into a well 74 to prevent the protection apparatus 12 from moving back toward the surface 20 of the mount 16, thereby securing the protection apparatus 12 to the mount 16. Additionally, the first contact 24 has a shouldered portion 76 which engages a tip 78 of the spring 40 to prevent the contact 24 from being pulled out of the slot 30 once it has been fully inserted (the second contact has a similar shouldered portion and engages in a similar manner with the second spring). Although not shown in FIGS. 1–4, the mount 16 may include access holes that allow a tool, such as a screwdriver tip, to be used to disengage the tips of the springs from the shouldered portions of the contacts 24 and 26, which would allow removal of the contacts 24 and 26 and, if desired, removal of the protection apparatus 12 from the mount 16.

Figure 5:
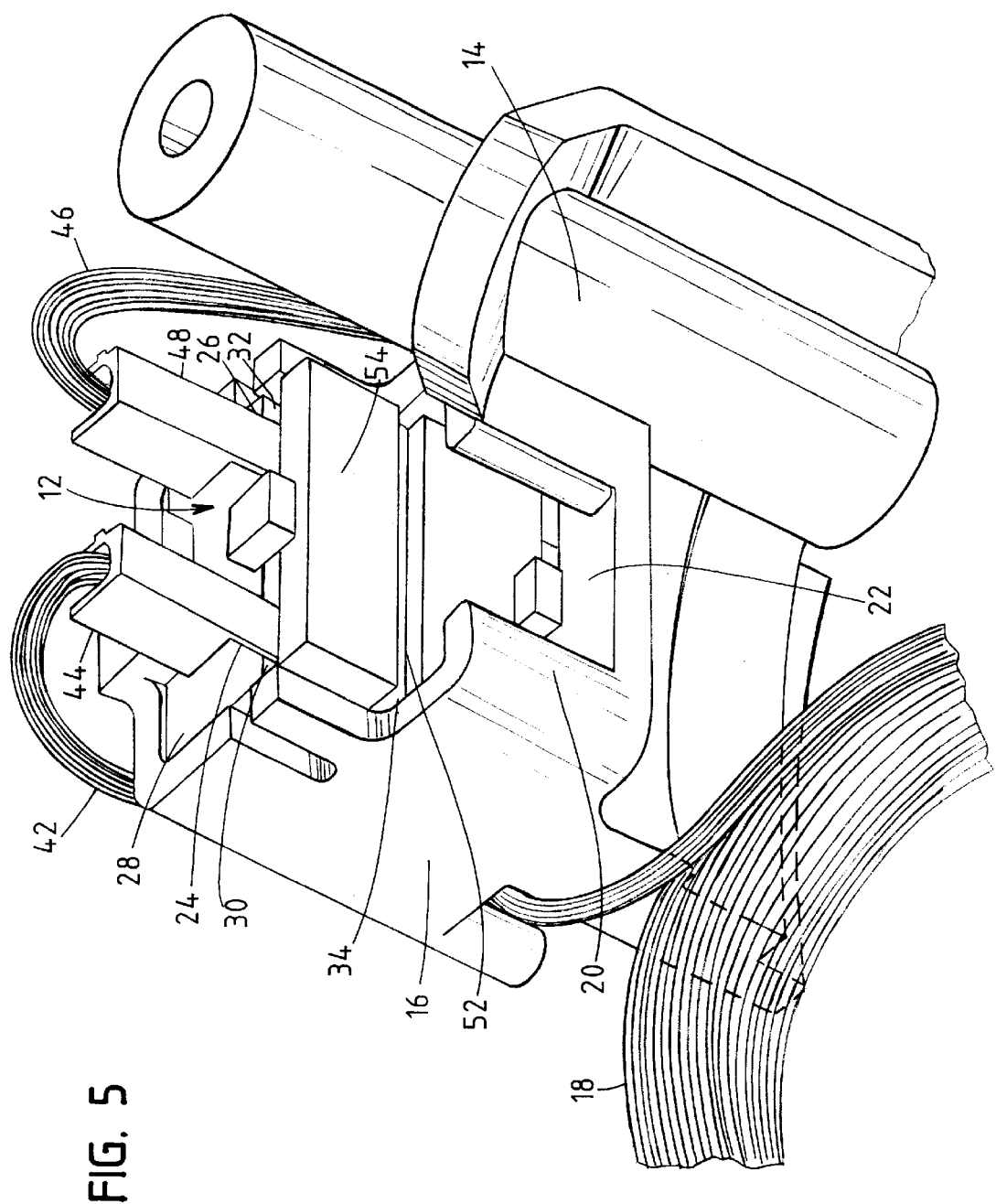
FIGS. 5 is an isometric view illustrating the protection apparatus of FIGS. 1–4 secured within the mount shown in FIGS. 1 and 3.

FIG. 5 is an isometric view illustrating the protection apparatus 12 of FIGS. 1–4 secured within the mount 16. As described above, the protection apparatus 12 is secured within the mount 16 so that heat from the winding 18 is conducted through the opening 22, the aperture 52 and to the pin 34 to cause the pin 34 to be substantially thermally responsive to the temperature of the winding 18.

In operation, a thermal overload condition in the motor 14 causes heat to be generated in the winding 18. The heat from the winding 18 is conducted through the aperture 52 to the pin 34 and when the ambient temperature surrounding the pin 34 becomes sufficiently high, the pin 34 fuses to permanently interrupt the flow of power to the winding 18 of the motor 14. In preferred embodiments, the protection apparatus 12 is designed as a safety device for a one-time operation and is not field repairable/resettable, but it is envisioned that some applications may, for example, permit repair via replacement of the pin 34.

It should be understood that a range of changes and modifications can be made to the embodiments described above. It is therefore intended that the foregoing detailed description be regarded as illustrative rather than limiting and that it be understood that it is the following claims, including all equivalents, which are intended to define the scope of this invention.

What is claimed is:

1. A thermally responsive protection apparatus for an electric motor, comprising:

an electrically insulating carrier having a surface adjacent to a winding of the motor, wherein the surface provides a thermal passage between the surface of the carrier and a cavity within the carrier;

first and second electrical contacts spaced apart and secured to the carrier; and a fusible electrically conductive pin disposed within the cavity and having first and second end portions engaged with the contacts, wherein at least one of the contacts forces the pin against a wall defining at least a portion of the cavity, and wherein the pin is adapted to fuse in response to a temperature of the winding.

2. The thermally responsive protection apparatus of claim 1, wherein the surface further comprises an aperture that forms the thermal passage between the surface of the carrier and the cavity within the carrier.

3. The thermally responsive protection apparatus of claim 1, further comprising a spring that urges one of the first and second contacts into electrical contact with the fusible electrically conductive pin.

4. The thermally responsive protection apparatus of claim 3, wherein the one of first and second contacts includes a shouldered portion that engages with the spring to secure the one of the first and second contacts to the carrier.

5. The thermally responsive protection apparatus of claim 3, wherein the spring is a flat spring.

6. The thermally responsive protection apparatus of claim 1, wherein the carrier is adapted to engage with a mount attached to the motor.

7. The thermally responsive protection apparatus of claim 6, wherein the first and second contacts extend through the carrier to secure the carrier to the mount.

8. The thermally responsive protection apparatus of claim 1, wherein the fusible electrically conductive pin is substantially cylindrical.

9. The thermally responsive protection apparatus of claim 1, wherein the fusible electrically conductive pin is made substantially of solder.

10. The thermally responsive protection apparatus of claim 1, wherein the cavity within the carrier includes walls shaped to substantially conform with the fusible electrically conductive pin.

11. The thermally responsive protection apparatus of claim 1, wherein the carrier included slots for receiving the first and second contacts.

12. The thermally responsive protection apparatus of claim 1, wherein the first contact is associated with a magnet wire from the motor and the second contact is associated a power lead wire.

13. The thermally responsive protection apparatus of claim 3, wherein the one of the first and second contacts is disposed between the fusible electrically conductive pin and the spring.

14. A thermally responsive protection apparatus for an electric motor, comprising;

an electrically insulating carrier having a surface adjacent to a winding of the motor, wherein the surface includes an aperture that provides a thermal passage between the surface of the carrier and a cavity within the carrier;

first and second electrical contacts spaced apart and secured to the carrier; and a fusible electrically conductive pin disposed within the cavity and having first and second end portions engaged with the contacts, wherein at least one of the contacts forces the pin against a wall defining at least a portion of the cavity.

15. The thermally responsive protection apparatus of claim 14, further comprising a spring that urges one of the first and second contacts into electrical contact with the fusible electrically conductive pin.

16. The thermally responsive protection apparatus of claim 15, wherein the one of first and second contacts includes a shouldered portion that engages with the spring to secure the one of the first and second contacts to the carrier.

17. The thermally responsive protection apparatus of claim 15, wherein the one of the first and second contacts is disposed between the fusible electrically conductive pin and the spring.

18. The thermally responsive protection apparatus of claim 14, wherein the fusible electrically conductive pin is made substantially of solder.

19. The thermally responsive protection apparatus of claim 14, wherein the carrier includes slots for receiving the first and second contacts.

20. The thermally responsive protection apparatus of claim 14, wherein the first contact is associated with a magnet wire from the motor and the second contact is associated a power lead wire.

* * * * *

UNITED STATES PATENT AND TRADEMARK OFFICE
CERTIFICATE OF CORRECTION

PATENT NO. : 6,384,497 B1
DATED : May 7, 2002
INVENTOR(S) : Berray et al.

It is certified that error appears in the above-identified patent and that said Letters Patent is hereby corrected as shown below:

Column 6,
Line 57, please delete "included" and insert in its place -- includes --.

Signed and Sealed this

Sixth Day of August, 2002

*Attest:*

*Attesting Officer*

JAMES E. ROGAN
*Director of the United States Patent and Trademark Office*